US009361626B2

(12) United States Patent
Garcia-Barrio et al.

(10) Patent No.: US 9,361,626 B2
(45) Date of Patent: Jun. 7, 2016

(54) SOCIAL GATHERING-BASED GROUP SHARING

(71) Applicants: Laura Garcia-Barrio, Brooklyn, NY (US); Keith S. Kiyohara, Santa Monica, CA (US)

(72) Inventors: Laura Garcia-Barrio, Brooklyn, NY (US); Keith S. Kiyohara, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 267 days.

(21) Appl. No.: 13/652,545

(22) Filed: Oct. 16, 2012

(65) Prior Publication Data

US 2014/0108526 A1 Apr. 17, 2014

(51) Int. Cl.
G06Q 99/00 (2006.01)
G06F 15/16 (2006.01)
G06Q 30/02 (2012.01)
G06Q 50/00 (2012.01)
G06K 9/00 (2006.01)
H04L 12/58 (2006.01)

(52) U.S. Cl.
CPC ............... G06Q 30/02 (2013.01); G06Q 50/01 (2013.01); H04L 51/32 (2013.01); G06K 9/00221 (2013.01); H04L 51/14 (2013.01)

(58) Field of Classification Search
CPC ......... H04L 51/10; H04L 51/14; H04L 51/32; G06F 50/01; G06K 9/00221–9/00295
USPC ............ 709/201–207, 213; 382/118; 705/319
See application file for complete search history.

(56) References Cited

U.S. PATENT DOCUMENTS

| 8,194,940 | B1 * | 6/2012 | Kiyohara et al. | 382/118 |
| 8,312,087 | B2 * | 11/2012 | Svendsen et al. | 709/206 |
| 8,341,219 | B1 * | 12/2012 | Young | 709/204 |
| 8,396,246 | B2 * | 3/2013 | Anbalagan et al. | 382/100 |
| 8,510,383 | B2 * | 8/2013 | Hurley et al. | 709/205 |
| 8,560,625 | B1 * | 10/2013 | Hardman et al. | 709/206 |
| 8,572,000 | B1 * | 10/2013 | Weingarten | G06Q 10/00 705/320 |
| 8,612,517 | B1 * | 12/2013 | Yadid et al. | 709/203 |
| 8,645,485 | B1 * | 2/2014 | Yadid et al. | 709/206 |
| 8,649,572 | B2 * | 2/2014 | Gokturk et al. | 382/118 |
| 8,655,404 | B1 * | 2/2014 | Singh | G06Q 50/01 455/518 |

(Continued)

OTHER PUBLICATIONS

Jon Duck-Schlossberg et al., "Battlefield Awareness and Data Dissemination Intelligent Information Dissemination Server," Final Technical Report, Air Forces Search Laboratory, Lockheed-Martin Corporation, Nov. 1999, 31 pages.

(Continued)

*Primary Examiner* — Emmanuel L Moise
*Assistant Examiner* — Julian Chang
(74) *Attorney, Agent, or Firm* — Fish & Richardson P.C.

(57) ABSTRACT

Implementations include receiving a first image that displays context of an event, the first image being received during the event, receiving a first identifier associated with a first attendee, the first identifier being associated with a user profile in a computer-implemented social networking service and being determined based on processing of the first image to detect a presence of the first attendee in the first image, determining, based on the first identifier, that the first attendee is a contact of a user within the social networking service, populating an event social circle to include the first attendee, the event social circle being associated with the user and defining a distribution for digital content generated by the user within the social networking service, receiving digital content generated by a computing device of the user, and distributing the digital content based on the event social circle.

34 Claims, 7 Drawing Sheets

(56) References Cited

U.S. PATENT DOCUMENTS

| | | | | |
|---|---|---|---|---|
| 8,762,462 | B1* | 6/2014 | Duddu | H04L 51/18 709/204 |
| 8,856,121 | B1* | 10/2014 | Makki | G06F 17/30861 707/736 |
| 8,868,566 | B2* | 10/2014 | Yanagihara | G06Q 10/107 707/748 |
| 8,983,500 | B2* | 3/2015 | Yach | G06Q 10/109 455/412.2 |
| 2005/0096929 | A1* | 5/2005 | Gelormine | G06Q 30/02 707/736 |
| 2006/0036686 | A1* | 2/2006 | Shimogori | H04L 67/24 709/204 |
| 2007/0033109 | A1* | 2/2007 | Patten et al. | 705/26 |
| 2007/0033142 | A1* | 2/2007 | Patten et al. | 705/51 |
| 2007/0183634 | A1* | 8/2007 | Dussich et al. | 382/118 |
| 2007/0255785 | A1* | 11/2007 | Hayashi | G06F 17/30017 709/204 |
| 2007/0255807 | A1* | 11/2007 | Hayashi | H04L 12/58 709/219 |
| 2007/0291323 | A1* | 12/2007 | Roncal | 358/402 |
| 2007/0294428 | A1* | 12/2007 | Guy | G06Q 10/107 709/245 |
| 2008/0052349 | A1* | 2/2008 | Lin | 709/203 |
| 2008/0071774 | A1* | 3/2008 | Gross | G06F 17/30867 |
| 2008/0071872 | A1* | 3/2008 | Gross | G06Q 10/107 709/206 |
| 2008/0098087 | A1* | 4/2008 | Lubeck | G06Q 10/00 709/218 |
| 2008/0235084 | A1* | 9/2008 | Quoc | G06Q 30/0242 705/14.41 |
| 2008/0300944 | A1* | 12/2008 | Surazski | G06Q 10/06311 705/7.13 |
| 2008/0320139 | A1* | 12/2008 | Fukuda | G06Q 30/02 709/226 |
| 2009/0150297 | A1* | 6/2009 | Richard | 705/80 |
| 2009/0248692 | A1* | 10/2009 | Tsukagoshi | H04L 65/403 |
| 2009/0292549 | A1 | 11/2009 | Ma et al. | |
| 2009/0300546 | A1* | 12/2009 | Kwok et al. | 715/825 |
| 2010/0029326 | A1* | 2/2010 | Bergstrom et al. | 455/556.1 |
| 2010/0050090 | A1* | 2/2010 | Leebow | 715/751 |
| 2010/0149305 | A1* | 6/2010 | Catchpole et al. | 348/14.08 |
| 2010/0232656 | A1* | 9/2010 | Ryu | 382/118 |
| 2010/0245567 | A1 | 9/2010 | Krahnstoever et al. | |
| 2010/0277611 | A1* | 11/2010 | Holt et al. | 348/231.2 |
| 2010/0325218 | A1* | 12/2010 | Castro et al. | 709/206 |
| 2011/0064281 | A1* | 3/2011 | Chan | 382/118 |
| 2011/0087744 | A1* | 4/2011 | Deluca | G06Q 10/107 709/206 |
| 2011/0099199 | A1 | 4/2011 | Stalenhoef et al. | |
| 2011/0161423 | A1* | 6/2011 | Pratt et al. | 709/205 |
| 2012/0027256 | A1* | 2/2012 | Kiyohara et al. | 382/103 |
| 2012/0045093 | A1* | 2/2012 | Salminen et al. | 382/103 |
| 2012/0054691 | A1* | 3/2012 | Nurmi | 715/854 |
| 2012/0072848 | A1* | 3/2012 | Yonemoto | 715/744 |
| 2012/0076367 | A1* | 3/2012 | Tseng | 382/118 |
| 2012/0114199 | A1* | 5/2012 | Panyam et al. | 382/118 |
| 2012/0213404 | A1* | 8/2012 | Steiner | 382/103 |
| 2012/0213493 | A1* | 8/2012 | Luo | G06F 17/30056 386/248 |
| 2012/0221641 | A1* | 8/2012 | Richard | 709/204 |
| 2012/0224070 | A1* | 9/2012 | Burroff et al. | 348/207.1 |
| 2012/0226663 | A1* | 9/2012 | Valdez Kline et al. | 707/640 |
| 2012/0265758 | A1* | 10/2012 | Han et al. | 707/737 |
| 2012/0278387 | A1* | 11/2012 | Garcia | G06Q 50/01 709/204 |
| 2012/0278395 | A1* | 11/2012 | Garcia | 709/205 |
| 2012/0294495 | A1* | 11/2012 | Wren et al. | 382/118 |
| 2012/0314912 | A1* | 12/2012 | Nakagomi et al. | 382/115 |
| 2012/0314917 | A1* | 12/2012 | Kiyohara et al. | 382/118 |
| 2012/0320013 | A1* | 12/2012 | Perez | H04N 9/8205 345/207 |
| 2013/0013683 | A1* | 1/2013 | Elliott | 709/204 |
| 2013/0021368 | A1* | 1/2013 | Lee et al. | 345/619 |
| 2013/0058583 | A1* | 3/2013 | Gallagher | G06K 9/00684 382/224 |
| 2013/0066964 | A1* | 3/2013 | Odio | G06Q 50/01 709/204 |
| 2013/0080534 | A1* | 3/2013 | Ogawa et al. | 709/204 |
| 2013/0089243 | A1* | 4/2013 | Sauve et al. | 382/118 |
| 2013/0103742 | A1* | 4/2013 | Hsi | G06F 17/30274 709/203 |
| 2013/0117365 | A1* | 5/2013 | Padmanabhan et al. | 709/204 |
| 2013/0117692 | A1* | 5/2013 | Padmanabhan et al. | 715/753 |
| 2013/0124508 | A1* | 5/2013 | Paris et al. | 707/723 |
| 2013/0129159 | A1* | 5/2013 | Huijgens et al. | 382/118 |
| 2013/0156274 | A1* | 6/2013 | Buchmueller | G06Q 50/01 382/118 |
| 2013/0166574 | A1* | 6/2013 | Kang | G06Q 30/02 707/749 |
| 2013/0179802 | A1* | 7/2013 | Martinazzi | H04L 67/22 715/753 |
| 2013/0222369 | A1* | 8/2013 | Huston et al. | 345/419 |
| 2013/0226926 | A1* | 8/2013 | Beaurepaire | G06K 9/00704 707/740 |
| 2013/0227011 | A1* | 8/2013 | Sharma | G06Q 50/01 709/204 |
| 2013/0227031 | A1* | 8/2013 | Wells | H04M 1/274558 709/206 |
| 2013/0254816 | A1* | 9/2013 | Kennedy et al. | 725/109 |
| 2013/0262588 | A1* | 10/2013 | Barak et al. | 709/204 |
| 2013/0266194 | A1* | 10/2013 | Brookhart | 382/118 |
| 2013/0332525 | A1* | 12/2013 | Liu | G06Q 10/109 709/204 |
| 2013/0335573 | A1* | 12/2013 | Forutanpour et al. | 348/158 |
| 2013/0339358 | A1* | 12/2013 | Huibers et al. | 707/737 |
| 2013/0343618 | A1* | 12/2013 | Zomet | G06K 9/00677 382/124 |
| 2014/0006142 | A1* | 1/2014 | Gaudet | G06Q 50/01 705/14.45 |
| 2014/0011481 | A1* | 1/2014 | Kho | H04W 4/02 455/414.1 |
| 2014/0012925 | A1* | 1/2014 | Narayanan | G06Q 10/109 709/206 |
| 2014/0012926 | A1* | 1/2014 | Narayanan | G06Q 50/01 709/206 |
| 2014/0022402 | A1* | 1/2014 | Mishra et al. | 348/207.11 |
| 2014/0047023 | A1* | 2/2014 | Baldwin | G06Q 10/10 709/204 |
| 2014/0064576 | A1* | 3/2014 | Gong et al. | 382/118 |
| 2014/0079297 | A1* | 3/2014 | Tadayon et al. | 382/118 |
| 2014/0086458 | A1* | 3/2014 | Rogers | 382/118 |
| 2014/0086510 | A1* | 3/2014 | Couillard | G06K 9/00677 382/305 |
| 2014/0089320 | A1* | 3/2014 | Baldwin | G06F 17/30867 707/748 |
| 2014/0089418 | A1* | 3/2014 | Davenport | H04L 51/14 709/206 |
| 2014/0098174 | A1* | 4/2014 | Summers | 348/14.1 |
| 2014/0101275 | A1* | 4/2014 | Garcia | 709/206 |
| 2014/0108333 | A1* | 4/2014 | Jain | H04L 67/22 707/609 |
| 2014/0108526 | A1* | 4/2014 | Garcia-Barrio | G06Q 50/01 709/204 |
| 2014/0153837 | A1* | 6/2014 | Steiner | 382/218 |
| 2015/0088927 | A1* | 3/2015 | Sarrazin | G06Q 10/109 707/769 |
| 2015/0127740 | A1* | 5/2015 | Mei | H04M 3/56 709/204 |
| 2015/0172855 | A1* | 6/2015 | Mishra | H04W 4/02 455/418 |
| 2015/0195220 | A1* | 7/2015 | Hawker | H04L 51/02 709/206 |
| 2016/0050289 | A1* | 2/2016 | Cohen | H04L 67/30 709/204 |

OTHER PUBLICATIONS

Nathan Eagle et al., "Social Serendipity: Proximity Sensing and Cueing," MIT Media Laboratory Technical Note 580, May 2004, 18 pages.

Alice Emily Marwick, "Selling Your Self: Online Identity in the Age of a Commodified Internet," Thesis for degree of Master of Arts, University of Washington, 2005, 192 pages.

(56) References Cited

OTHER PUBLICATIONS

Sara Metcalf et al., "Spatial Dynamics of Social Network Evolution," Proceedings of the 23rd International Conference of the System Dynamics Society, Jul. 19, 2005, 13 pages.

Jeffrey Heer et al., "Vizster: Visualizing Online Social Networks," IEEE Symposium on Information Visualization (INFOVIS 2005), Oct. 23-25, 2005, pp. 32-39.

International Search Report and Written Opinion in International Application No. PCT/US2013/064779, mailed on Jan. 22, 2014, 11 pages.

International Preliminary Report on Patentability in International Application No. PCT/US2013/064779, mailed Apr. 30, 2015, 8 pages.

\* cited by examiner

Search  Mail  Social.Network  Videos  Books  More...

Rob McDavies
view profile

Stream
Incoming
News
Videos
Circles
Gadgets & Games
Questions
Music
Photos

Search [______________] Search

Share what's new ....                              [📷] [▭] [👤] [♀]

33 new people are sharing with you!     Visit Incoming to
[👤][👤][👤][👤] + 27 more                 see their posts ...  [X]

[👤] Katie commented on Irene's post
     [👤] Irene
     I'm headed to the Farmers Market later today to pick up
     some produce. It tastes fresh and is local!

Anyone want to come along? I'll drive!

Brandon and 3 others endorse this

[👤] Tamara – I want to come! Can you pick me up? 12:42 pm
     [👤] Irene – Definitely. See you around 3. 12:58 pm Endorse  Comment  Share           20 minutes ago  ⊙ *Public*

You're interested in music videos - edit
     Justin Webber - Somebody Does Love Me
     [▨]              by JustinWebberVEVO
          Video       Music video by Justin Webber performing
                      Somebody Does Love Me Remix. (C) 2010
                      The Big Island Def Jams Music Group

SOCIAL GATHERING-BASED GROUP SHARING

BACKGROUND

Internet-based social networking services provide a digital medium for users to interact with one another and share information. For examples, users are able to distribute digital content (e.g., textual comments, digital images, digital videos, digital audio, hyperlinks to websites, etc.) to other users that they might be connected with in the social networking service. Digital content that is distributed to a user can be displayed to the user in a stream page.

SUMMARY

This specification generally relates to distributing items of digital content in social networking services.

In general, innovative aspects of the subject matter described in this disclosure may be embodied in methods that include actions of receiving a first image that displays context of an event, the first image being received during the event and having been generated by a computing device of a user, receiving a first identifier associated with a first attendee, the first identifier being associated with a user profile in a computer-implemented social networking service and being determined based on processing of the first image to detect a presence of the first attendee in the first image, determining, based on the first identifier, that the first attendee is a contact of the user within the social networking service, populating an event social circle to include the first attendee, the event social circle being associated with the user and defining a distribution for digital content generated by the user within the social networking service, receiving digital content generated by a computing device of the user, and distributing the digital content based on the event social circle. Other implementations include corresponding systems, apparatus, and computer programs, configured to perform the actions of the methods, encoded on computer storage devices.

These and other implementations may each optionally include one or more of the following features. For instance: the computing device includes a wearable computing device; the first image is provided as a frame of a video; the video is streaming video of the event; the first image is processed to detect and recognize the first attendee within the first image; populating an event social circle to include the first attendee is executed in response to determining that the first attendee is a contact of the user within the social networking service and that the first attendee can be added to event social circles of the user; determining that the first attendee can be added to event social circles of the user includes determining that the user and the first attendee mutually agree to be included in event social circles of each other; determining that the first attendee can be added to event social circles of the user includes determining that the first attendee has agreed to be included in event social circles of other users of the social networking service; actions further include providing a notification to the first attendee that the first attendee has been added to the event social circle; actions further include suggesting one or more social circles that can be used to share the digital content; each of the one or more social circles include the first attendee; actions further include populating the event social circle to include a second attendee, the second attendee being a contact of each of the user and the first attendee within the social networking service and being absent from images generated during the event; actions further include: receiving a second image that displays context of the event, receiving a second identifier associated with a second attendee, the second identifier being associated with a user profile in a computer-implemented social networking service and being determined based on processing of the second image to detect a presence of the second attendee in the image, determining, based on the second identifier, that the second attendee is not a contact of the user within the social networking service, the user having provided the second image, and in response to determining that the second attendee is not a contact of the user, excluding the second attendee from the event social circle; and receiving and distributing the digital content are performed automatically in response to generation of the digital content.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 3 depicts a screen-shot of an example web page including an activity stream for a user of a social networking service.

Like reference numbers represent corresponding parts throughout.

DETAILED DESCRIPTION

In general, implementations of the present disclosure are directed to sharing digital content in one or more computer-implemented social networking services. More particularly, implementations of the present disclosure are directed to defining one or more event social circles based on detecting the presence of one or more users at an event, and using the one or more event social circles to distribute digital content in the one or more social networking services. In some examples, a user of the social networking service may attend an event and desire to identify and share digital content with attendees (e.g., also users of the social networking services) that are also at the event. In some implementations, while present at the event, the user can activate a sharing session during which digital content can be automatically shared with the attendees. In some implementations, a client device acquires images that display a context of the event. In some implementations, the images are processed to recognize one or more attendees at the event. One or more event social circles can be populated with the one or more attendees that are present at the event. In some examples, during the event, the user can share digital content with the one or more attendees using the one or more event social circles.

For purposes of illustration, implementations of the present disclosure are described within the context of an example social networking service. The example social networking service enables users to organize contacts into social circles. It is appreciated, however, that implementations of the present disclosure can be used in other types of social networking services and are not limited to social networking services that include social circles.

Figure 1:
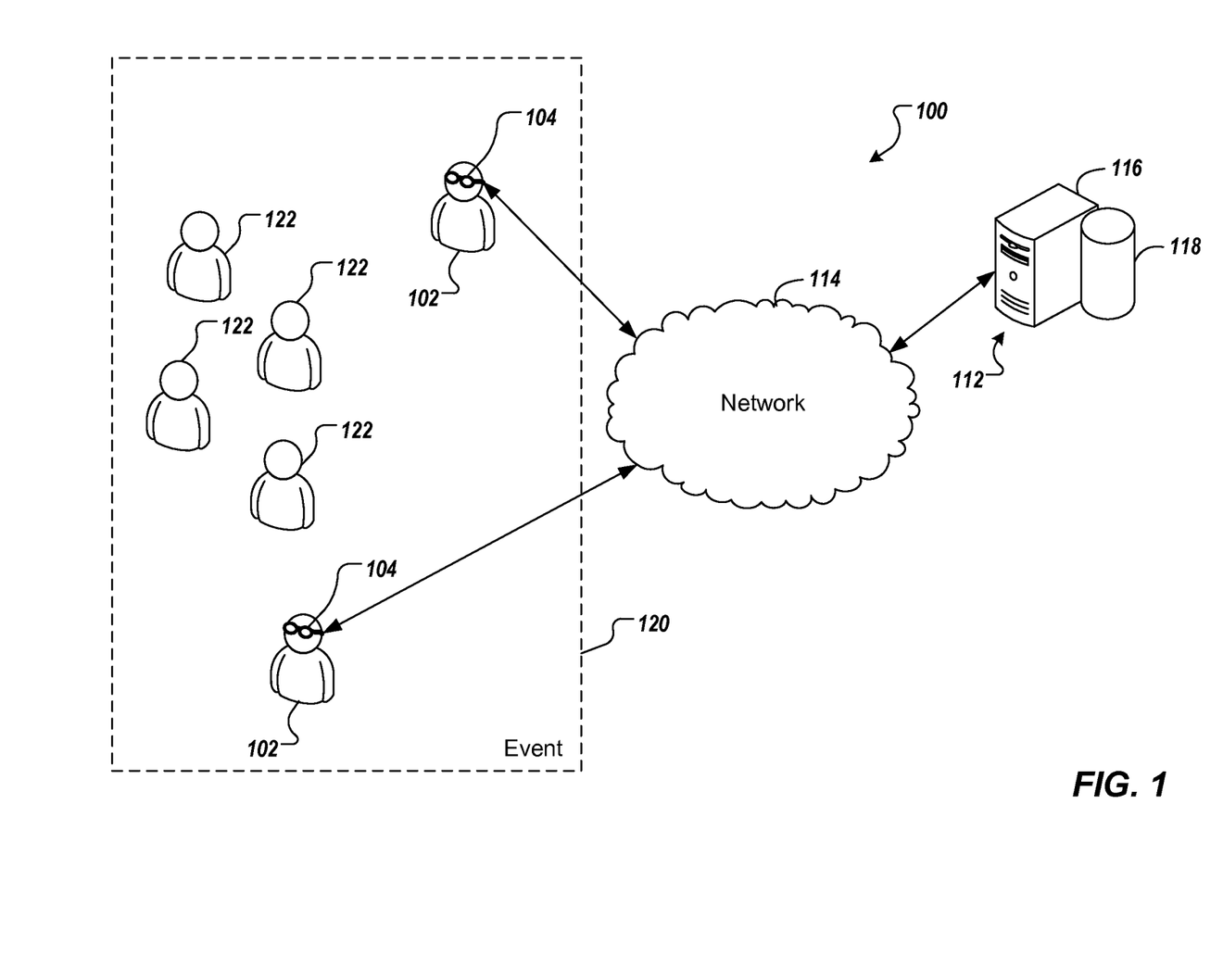
FIG. 1 is a diagram of an example network architecture.

FIG. 1 is a diagram of an example network architecture 100. The network architecture 100 includes one or more client devices 102 communicably connected to a server system 112 by a network 114. The server system 112 includes a processing device 116 and a data store 118. The processing device 116 executes computer instructions stored in the data store 118, e.g., to perform the functions of a social network server.

Users 102 of the client devices 104 access the server device 112 to participate in a social networking service. For example, the client devices 104 can execute web browser applications that can be used to access the social networking service. In another example, the client devices 104 can execute software applications that are specific to the social networking service (e.g., social networking "apps" running on smartphones).

Users 102 interacting with the client devices 104 can participate in the social networking service provided by the server system 112 by distributing digital content, such as text comments (e.g., updates, announcements, replies), digital images, videos, audio files, and/or other appropriate digital content. In some implementations, information can be posted on a user's behalf by systems and/or services external to the social networking service or the server system 112. For example, the user 102 can distribute an item including a photograph displaying individuals who are present at an event, and with proper permissions, the social networking service may distribute the image to other users of the social networking service on the user's behalf. In another example, a software application executing on a mobile device, with proper permissions, can use global positioning system (GPS) capabilities to determine the user's location and automatically update the social network with his location (e.g., "At Home", "At Work", "In Brownsdale, Minn."). Generally, users 102 interacting with the client devices 104 can use the social networking service provided by the server system 112 to define social circles to organize and categorize the user's relationships to other users of the social networking service. Examples of the creation and use of social circles are provided below.

In some implementations, the client devices 104 can be provided as computing devices such as laptop or desktop computers, smartphones, personal digital assistants, portable media players, tablet computers, or other appropriate computing devices that can be used to communicate with an electronic social network. In some examples, the client devices 104 can include recording devices that are operable to capture images (e.g., a single image or a series of images that collectively provide a video feed).

In some implementations, the client devices 104 are each provided as computing device that is integrated with a wearable accessory. In some examples, the wearable accessory is adapted to attach to and/or rest on the respective user. Example wearable accessories include eyeglasses, eyeglass frames, necklace pendants, and brooches. In the depicted example, each client device 104 is integrated with eyeglasses or eyeglass frames.

In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

In the example of FIG. 1, each of the users 104 is present at (is attending) an event 120. Example events are discussed in further detail herein. Other users 122 are also present at (are attending) the event 120.

In general, social circles are categories to which users 102 can assign their contacts (e.g., members of a social network in which the users 102 belong or other contacts of the users 202) and better control the distribution and visibility of digital content (e.g., social networking posts). A social circle can be provided as a data set defining a collection of contacts that may have some association with one another. Generally, a social circle can be described from the perspective of an individual that is the center of a particular collection of socially interconnected people, or from the aggregate perspective of a collection of socially interconnected people. In some implementations, a social circle can have narrowly defined boundaries, where all of the members of the social circle are at least familiar with one another, and permission may be required for a member to join a social circle. In some implementations, a social circle can have broadly defined boundaries where, for example, none of the members are familiar with one another, but there is a commonality among all members (e.g., ride the same bus, are at the same location, are attending the same event, frequent the same locations or partake in the same activities).

In some implementations, a social circle provides a distribution list within a social networking environment that defines which users receive or are otherwise allowed to access digital content. Example digital content can include textual content (e.g., posted text), status updates (e.g., busy, available, offline, check-in status), images, videos, hyperlinks and the like. In some implementations, the digital content can include a corresponding access control list (ACL), discussed in further detail below, that defines which users are to receive and/or are able to access the digital content.

Through the creation and use of social circles, the users 102 can organize and categorize contacts into various different circles that can be used to control the visibility and access that those contacts have to the user's digital content (e.g., postings, digital pictures, videos, audio files, hyperlinks (e.g., uniform resource indicators (URIs)), and/or other content associated with the user's social networking profile). In some examples, the users 102 can post an update or photo associated with an event to only an "event" circle, and spare other contacts from seeing information that may not be relevant to them.

Figure 2:
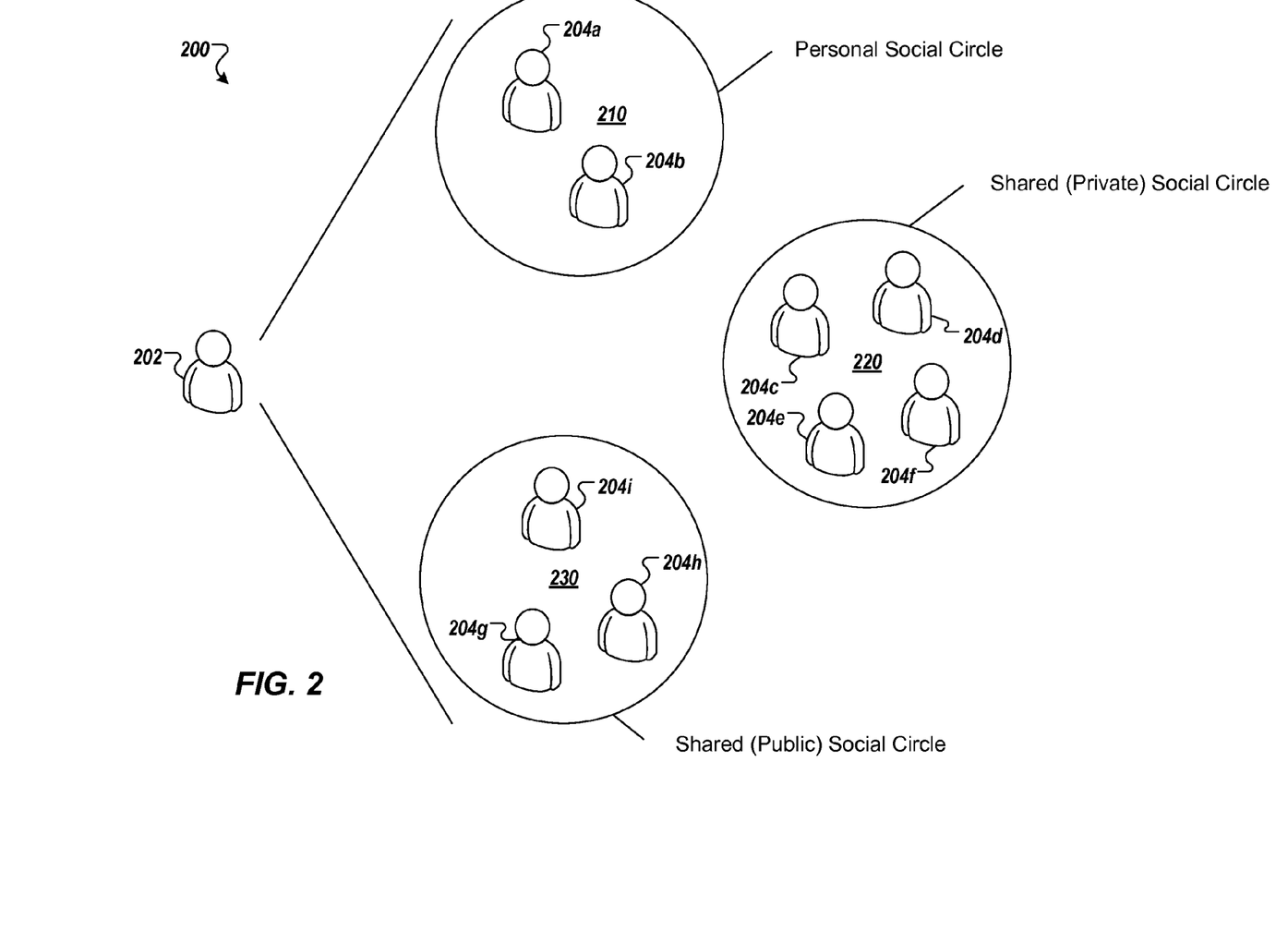
FIG. 2 depicts an example social network including social circles.

FIG. 2 is a diagram of an example social network 200 including social circles. A user 202 is a member of a social network that supports the creation and use of social circles (e.g., the social network provided by the server device 112 of FIG. 1). In the present example, the user 202 has a number of contacts 204a-204i with which the user 202 can have some form of direct or indirect social relationship (e.g., friends, friends-of-friends, coworkers, customers, teammates, clients, relatives, club members, classmates). The user 202 categorizes the contacts 204a-204i by assigning them to one or more social circles, such as a social circle 210, a social circle 220, and a social circle 230.

The social circle 210 is a personal social circle. In some implementations, personal social circles are circles created by and may be known only to the user 202 (e.g., the contacts 204a, 204b may receive no indication that they are in the user's 202 personal social circle 210). In some implementations, personal social circles are circles created by the user 202 and may be known to the user 202 as well as to the contacts (e.g., contacts 204a, 204b) that are members of the social circle (e.g., the contacts 204a, 204b receive an indication that they have been added to the personal social circle 210).

In some implementations, personal social circles may be used to organize and categorize the contacts 204a-204i in ways that are relevant to the user 202. In some implementations, the user 202 may use personal social circles to organize contacts in order to discretely target which of his contacts 204a-204h will see certain postings or have access to particular information. For example, the user 202 may be planning a surprise party for a small group of friends. Accordingly, the user can organize contacts into "Surprise Party Attendees" and "Surprise Party Honorees" personal social circles. By doing so, the user 202 may better target selected postings to the friends attending and/or helping to plan the surprise party (i.e., Surprise Party Attendees), while targeting selected postings to friends that are to be honored at the surprise party (i.e., Surprise Party Honorees) to maintain the integrity of the surprise.

The social circle 220 is a shared private social circle, which may also be referred to simply as a shared circle. In general, shared private social circles are social circles that the user 202 creates and invites contacts to voluntarily join. Contacts that accept the invitation become members of the shared private social circle. Members of a shared private social circle can see information posted to that circle by the user 202 and can post information to be shared with other members of the shared private social circle. For example, the user 202 may tend to post a large number of jokes to the social network. However, while some of the contacts 204a-204i may find the jokes to be entertaining, others may find them to be simply annoying. Realizing this, the user 202 may create a "jokes" shared private social circle and invite some or all of the contacts 204a-204i to join. With the "jokes" social circle in place, the user 202 may post witticisms to the "jokes" circle, and only those contacts who have accepted the invitation are able to see the user's 202 comicality. Similarly, members of the shared private social circle are able to post messages to the circle, and those posts are visible to other members of that circle.

The social circle 230 is a shared public social circle. In general, shared public circles are social circles that the user 202 creates, and invites contacts to voluntarily join. Further, the existence of a shared public circle is publicly available such that other users of the social networking service (e.g., not necessarily just the user's 202 contacts 204a-204i) may request to join the public social circle. Members of shared public circles may post information to, and see updates posted by, other members of the same public shared circle. In some implementations, public shares circles may be "fan" or "group" circles (e.g., circles dedicated to a particular place, event, product, movie, celebrity, sports team, company, concept, philosophy, organization or support network). For example, the user 202 may create a shared public circle for his band, and fans of the user 202 may join the circle to discuss upcoming shows, download MP3s of the band's music, or post videos from recent concerts. In another example, the user 202 may create a shared public circle for alumni of his high school graduating class, which former classmates may find and join in order to stay in touch with one another and post pictures from their school days. Once a shared public circle is created, in some implementations, the user 202 can invite people to join the circle. In some implementations, nonmembers of the circle can request membership in the shared public circle, and membership in a shared public circle may be automatic upon request, or may require the user's 202 approval to become members of the shared public circle.

FIG. 3 depicts a screen-shot of an example web page 300 including an activity stream 304 for a user of a social networking service. For example, the web page 300 can be provided as a web page within a website of a social networking service and can display items of digital content that have been shared with a user associated with the web page 300. In the illustrated example, the example user includes "Rob McDavies" and the web page 300 displays items of digital content that other users have shared with the user and/or items that the user has shared with other users. The web page 300 includes a social network menu 302 and the activity stream 304. As used herein, the term activity stream can include a graphically displayable collection of items that have been distributed to and/or from, or are otherwise accessible by a user of a social networking service. Example items 306, 308 that have been distributed to the user are displayed in the activity stream 304. Generally, the items 306, 308 displayed in the activity stream 304 include digital content that is distributed to the user from contacts established within the social networking service. A content-sharing interface 310 can also be provided. The user can activate (e.g., click on) the content sharing interface 310 to share digital content. Although two items 306, 308 are depicted in FIG. 3 it is appreciated that the activity stream 300 can display any number of items to the user.

Implementations of the present disclosure are directed to defining one or more event social circles based on detecting and recognizing one or more users that are attending an event (e.g., attendees), and using the one or more event social circles to distribute digital content in one or more social networking services. As discussed in further detail herein, one or more event social circles can be defined based on the detecting the presence of and recognizing one or more attendees at an event. In some examples, digital content associated with the event (e.g., digital content generated during the event) can be distributed using the one or more event social circles. In this manner, the one or more event social circles define a relevant audience for the digital content (e.g., attendees of the event).

In some examples, a user (e.g., one of the users 102 of FIG. 1) of a social networking service may attend an event (e.g., the event 120 of FIG. 1). In general, events can be defined with varying degrees of specificity based on parameters associated with the event. For example, an event can be a pre-planned event that is specific to a date, time and/or location (e.g., a concert, a performance, a party, a luncheon, a family reunion, a meeting, a conference). An event can be a pre-planned event provided in more general terms (e.g., Earth Day, History Month). In some examples, an event can be defined as a longer-timeline event based on location (e.g., an event is occurring when a computing device is at a particular location). In some examples, an event can be impromptu. For example, two or more users can bump into each other at a location and socialize. In general, an event can be defined as a gathering (e.g., a social gathering) of two or more users regardless of whether the gathering was planned or the purpose of the gathering. For example, the event can be provided as one or more users that are contemporaneously at a location (e.g., that are "here and now").

In accordance with implementations of the present disclosure, a user might desire to define a social circle based on the event. In this manner, the user can share digital content with attendees of the event. In some implementations, a computing device of the user (e.g., the client device 104 of FIG. 1) can be used to identify one or more attendees and define one or more event social circles that can be used to share digital content with the one or more attendees. In some implementations, while present at the event, the user can activate a sharing session during which the user can use a client device (e.g., the client device 104 of FIG. 1) to acquire images that display a context of the event. In some examples, the images can be acquired as individual images or as a video that includes a series of images that collectively define the video. In some examples, the context can include attendees of the event and/or other objects present within an environment of the event.

In some implementations, the client device may capture images in response to an input received from the user. In some examples, the image can be generated in response to the user providing a shutter input (e.g., the user "clicking" a shutter button or shutter graphic displayed on a display of the client device). In some examples, the input can include a user-defined image capture interval at which the client device is to capture the images (e.g., capture an image every X minutes). In some examples, the input can include a command to continuously video the event. In some examples, the input can include a start time and/or an end time at which the client device is to respectively start and stop acquiring images, or recording video. In any case, an image can be provided as a stand-alone, captured image, or an image that is a frame of a recorded video.

In some implementations, one or more images are processed to detect the presence of an attendee and to recognize the attendee. In some implementations, an image can include one or more attendees depicted therein. In some examples, the image can be processed using a detection process (e.g., facial detection) to determine that one or more attendees are present in the image. In some examples, each image can be modeled as a vector of image feature data, which can be processed for characteristics such as facial features, skin color and skin texture, the presence of which can indicate the presence of one or more attendees in the image.

If it is determined that one or more attendees are present in the image, the image can be further processed to attempt to recognize (e.g., facial recognition) each of the one or more attendees. In some examples, a facial model for each attendee detected in the image is generated and can be compared to facial models corresponding to known identities. In some examples, a facial model can include a facial template corresponding to a detected attendee. In some examples, a facial template can include one or more feature vectors associated with the detected attendee, which feature vectors can be rotated and normalized.

Each facial model is compared to known facial models. If there is correspondence between a facial model and a known facial model, the facial model can be identified as being of the same identity as the known facial model. Known facial models can include facial models that have been created, stored and are accessible. Known facial models can include facial models corresponding to public figures such as celebrities, politicians, athletes and other publicly known people. For example, facial models corresponding to public figures can be generated based on publicly available images, each image being used to generate a facial template. Known facial models can include facial models corresponding to non-public figures. In some implementations, a database of known facial models corresponding to non-public figures can store previously generated facial models. The facial models can be generated based on images including known identities. For example, a user "Bob" of a social networking service can upload and publish images using the social networking service, and can "tag" himself, or otherwise indicate his presence in the images. In some examples, other users of the social networking service, and who have access to images published by the user Bob, can likewise tag the images. Such published images can be processed to generate a facial model corresponding to Bob and/or any other users tagged (identified) in the image.

In some implementations, the client device can process images to detect the presence of attendees and/or to recognize detected attendees. In some implementations, the client device can provide one or more images to a backend service that can process images to detect the presence of attendees and/or to recognize detected attendees. In some examples, one or more images are sent from the client device via a network (e.g., the network 114) to a processing device (e.g., the processing device 116).

In some implementations, one or more of the attendees may be users of the one or more social networking services. In some examples, it can be determined whether an attendee that has been recognized from an image (e.g., a recognized attendee) is also a user of the one or more social networking services. If it is determined that the recognized attendee is a user of the one or more social networking services, it can be determined whether the recognized attendee has a social relationship with a user of the client device that captured the image that the recognized attendee was recognized from. In the context of the example social networking service discussed above, the recognized attendee can be in one or more social circles (e.g., a personal circle, a shared private social circle, or a shared public social circle) already defined by the user. In some examples, the user may also be in one or more social circles of the recognized attendee. In some examples, and in response to the user and the recognized attendee being contacts within a social networking service, the recognized attendee can be automatically added to an event social circle of the user.

In some implementations, it can be determined whether the recognized attendee has already agreed to be automatically added to event social circles. If the user and the recognized attendee are contacts of one another within the social networking service, and the recognized attendee has agreed to be automatically added to event social circles, the recognized attendee can be automatically added to an event social circle of the user. In some implementations, it can be determined whether the user and the recognized attendee have both already agreed to be automatically added to event social circles as described herein. If the user and the recognized attendee are contacts of one another within the social networking service, and there is mutual agreement to be automatically added to event social circles, the recognized attendee can be automatically added to an event social circle of the user.

In some implementations, the event social circle is a personal social circle that enables the user to share images and/or other digital content to recognized attendees that are members of the event social circle. In some implementations, the event social circle is dynamic. For example, as attendees are recognized from captured images generated by the client device during the event, attendees can be added to the event social circle. In this manner, the number of recognized attendees provided in the event social circle can change (e.g., increase) during the event. In some examples, the attendee may be removed from an event social circle. In some implementations, a recognized attendee that is to be or that has been added to the event social circle can receive a notification via the social networking service. In some examples, the notification can indicate that the recognized attendee has been added to the event social circle. In some examples, the notification can indicate that the recognized attendee is to be added to an event social circle. In some examples, and in response to a notification, a recognized attendee can provide explicit approval or disproval to being added to the event social circle. In some examples, notifications can indicate to which user the event social circle belongs (e.g., "You have been added to Bob's event social circle!," or "Bob would like to add you to an event social circle").

In some implementations, the social networking service may store the event social circle in association with a profile of the user within the social networking service. In some examples, the event social circle can persist after the event has concluded. In this manner, the user can continue to use the event social circle to distribute digital content, although the event that inspired the event social circle has concluded. In some implementations, the social networking service may delete the event social circle upon conclusion of the event or upon expiry of a period of time after conclusion of the event (e.g., X day(s) after the event has determined to be concluded).

In some implementations, digital content (e.g., textual comments, images, video) generated by the client device can be automatically shared with contacts provided in the event social circle. In some examples, automatic sharing of digital content is achieved without further user input after the digital content has been generated. In some examples, the client device can send digital content to the social networking service, and the social networking service can automatically share the digital content with contacts of the event social circle. In some examples, the digital content is automatically sent to the social networking service in response to generation of the digital content. In some examples, the client device can send or stream a video being captured to the social networking service, and the social networking service can automatically share the video with contacts of the event social circle. In some examples, the video is automatically sent or streamed to the social networking service in response to generation of the video. In general, and in some examples, digital content may be shared with contacts of the event social circle in real-time, upon being acquired or generated by the client device. In this manner, digital content generated during the event can be automatically shared with recognized attendees. In some implementations, digital content can be shared with contacts of the event social circle at a predetermined period of time following acquisition or generation of the digital content by the client device.

In some implementations, the user can manually share digital content with contacts of the event social circle. In some examples, manual sharing of digital content is achieved based on further user input after the digital content has been generated. In some examples, and in response to user input prompting sharing of digital content, the client device can send digital content to the social networking, and the social networking service can share the digital content with contacts of the event social circle.

As discussed above, the event social circle can be dynamic in that recognized attendees can be added and/or removed during the event. For example, an event social circle can include a first set of contacts during a first time period and can include a second set of contacts during a second time period. Consequently, first digital content generated during the first time period can be distributed to the first set of contacts and second digital content generated during the second time period can be distributed to the second set of contacts. In some examples, the first digital content can be distributed to (or made accessible to) a recognized attendee that was not included in the first set of contacts, but is included in the second set of contacts (e.g., a later added recognized attendee). In some examples, access to the first digital content and the second digital content can be inhibited for a recognized attendee that was included in the first set of contacts, but is not included in the second set of contacts (e.g., a later removed recognized attendee).

In some implementations, the social networking service can suggest one or more other social circles for distributing digital content based on recognized attendees that are provided in the event social circle. In some examples, it can be determined that one or more recognized attendees are also members of another social circle defined by the user. In response, the other social circle can be suggested to the user for sharing digital content. For example, one or more recognized attendees of the event social circle can also be provided in a "Family" social circle that has been previously defined by the user. Consequently, the "Family" social circle can be suggested to the user as another social circle, through which digital content generated at the event could be shared (e.g., automatically) with (e.g., the user can decide to share digital content with the event social circle and the "Family" social circle).

In some examples, suggesting another social circle for sharing can be based on whether a threshold number of contacts within the event social circle are also contacts within one or more other social circles of the user. In some examples, if a threshold number of contacts provided in the event social circle are each provided in another social circle of the user, the other social circle can be suggested to the user to share the digital content during the event. In some examples, the threshold number is provided as a default threshold number. In some examples, the threshold number is defined by the user.

Figure 4A:
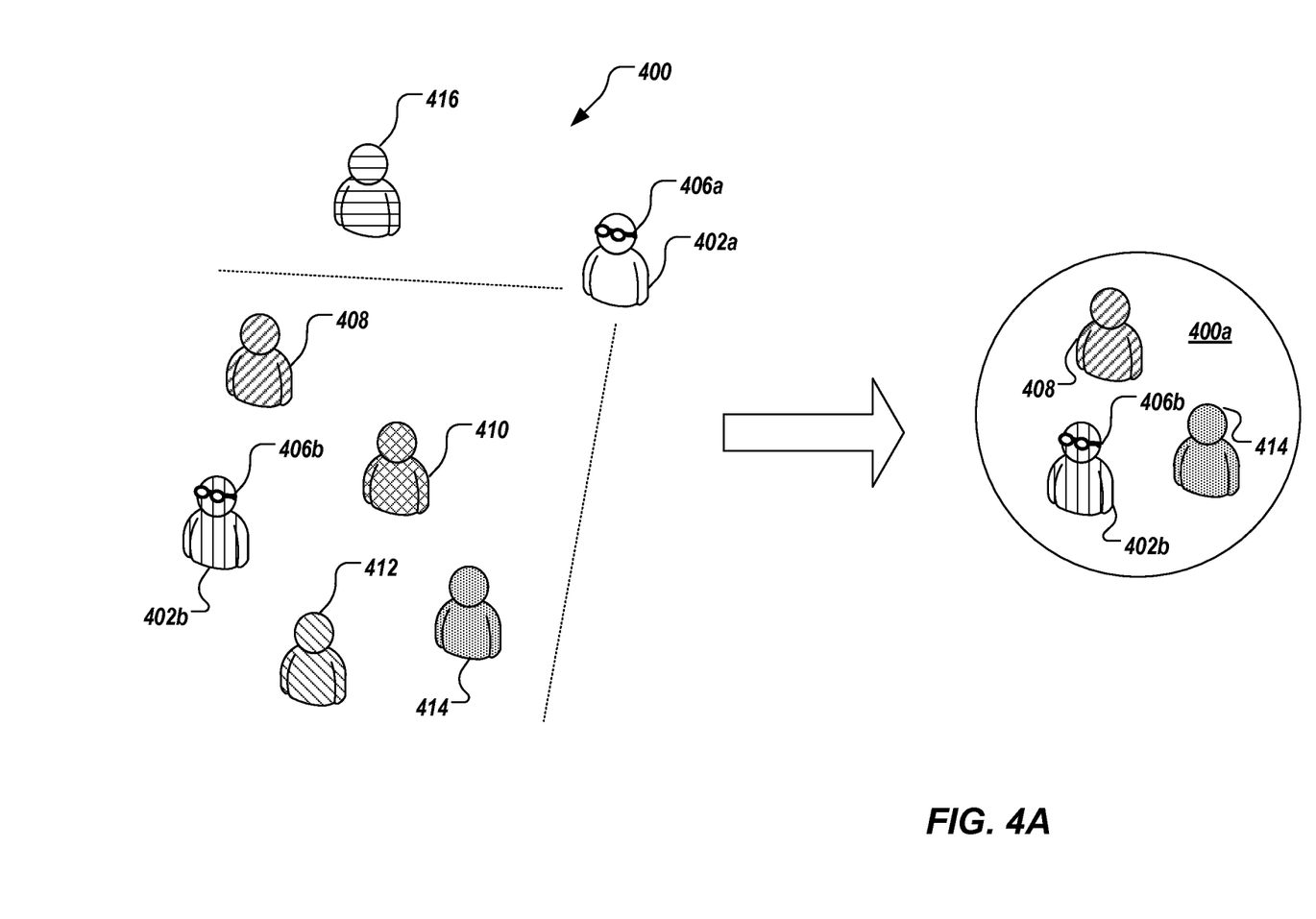
FIGS. 4A and 4B depict example generation of event social circles for respective users based on example sessions.
Figure 4B:
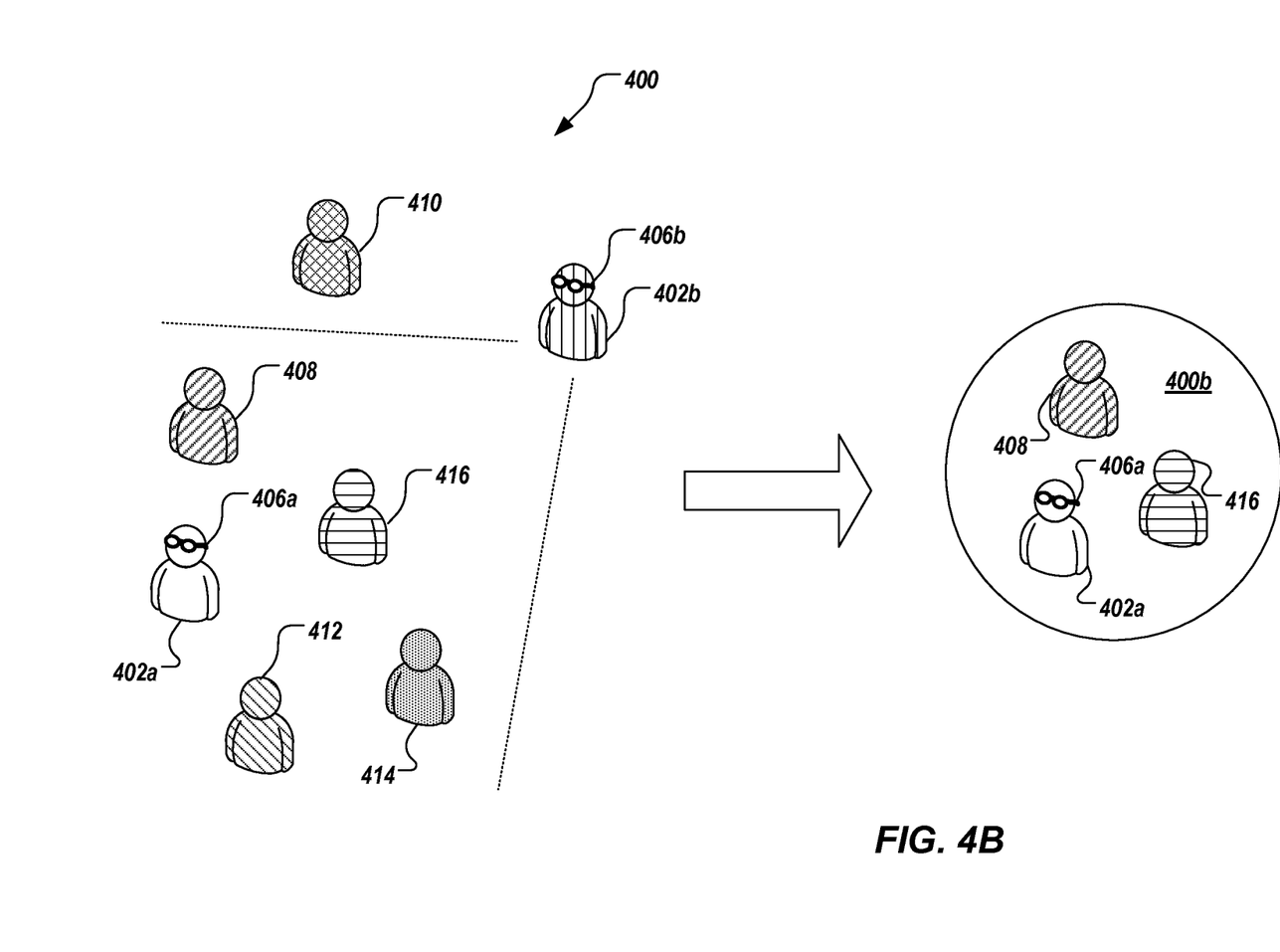

FIGS. 4A and 4B depict example generation of event social circles 400a, 400b for respective users 402a, 402b based on example sessions 404a, 404b. In some examples, the users 402a, 402b attend an event 400 (e.g., a social gathering). In the depicted example, attendees 408, 410, 412, 414 are present at the event 400. Each of the users 402a, 402b can also be considered an attendee of the event 400. The users 402a, 402b have respective client devices 406a, 406b. In some examples, each user 402a, 402b can activate a session (e.g., each of the client devices 406a, 406b can be switched to an event-sharing mode), during which the client devices 406a, 406b can acquire images of attendees 402a, 402b, 408, 410, 412, 414, 416 to define one or more event social circles (e.g., the event social circles 400a, 400b), and to share digital content using the one or more event social circles. In some examples, the sessions may start at a particular time (e.g., once the users 402a, 402b walk into a venue at which the event is being held) and/or in response to user input.

With particular reference to FIG. 4A, the user 402a (e.g., the user Rob McDavies of FIG. 3) uses the client device 406a to generate images of the attendees 408, 410, 412, 414 and the user 402b during the session. In the depicted example, the user 402a does not acquire an image of the attendee 416 during the session. For example, the client device 406a may acquire a first image that includes the attendees 408, 410. The client device 406a sends the first image over a network (e.g., the network 114 of FIG. 1) to a processing device (e.g., the processing device 116 of FIG. 1). In some examples, the processing device executes facial detection and recognition based on the first image, as discussed herein. In some examples, it can be determined that the attendee 408 is a contact of the user 402a within one or more social networking services. In some examples, it can be determined that the attendee 410 is either not recognizable or is not a contact within the one or more social networking services. In the example of FIG. 4A, it can be determined that the attendee 408 can be included in the event social circle 400a associated with the user 402a. In the example of FIG. 4A, the attendee 410 is not added as a contact to the event social circle 400a, because the attendee 410 is either not recognizable or is not a contact of the user 402a.

In a further example, the client device 406a may acquire a second image that includes the user 402b and the attendees 412, 414. The second image can be processed for facial detection and recognition, as discussed herein. In the example of FIG. 4A, it can be determined that the user 402b and the attendee 414 are each contacts of the user 402a in the one or more social networking services and that each of the user 402b and the attendee 414 can be added to event social circles of the user 402a. Consequently, the user 402b and the attendee are each added to the event social circle 400a. In some examples, the attendee 416 may be a contact of the user 402a within the one or more social networking services. However, the attendee 416 is not added as a contact to the event social circle 400a, because the attendee 416 is not identified in an image generated by the client device 406a during the session.

In some implementations, the social networking service can automatically share the first and second images and/or other digital content captured by the client device 406a with the contacts of the event social circle 400a. In some examples, sharing of digital content can be performed automatically in real-time (e.g., without requiring user input) upon generation of the digital content by the client device 406a. In some implementations, the social networking service can share digital content with the contacts of the event social circle 400a in response to receiving user input from the user 402a either during or after the event 400.

With particular reference to FIG. 4B, the user 402b, while attending the event 400, uses the client device 406b to acquire images of the attendees 408, 412, 414, 416 and the user 402a during the session. In the depicted example, the user 402b does not acquire an image of the attendee 410 during the session. For example, the client device 406b may acquire a first image that includes the attendees 408, 412. It can be determined that the attendee 408 is a contact of the user 402b within the one or more social networking services and that the attendee 408 can be added to event social circles of the user 402b. Consequently, the attendee 408 is included in the event social circle 400b. It can also be determined that the attendee 412 is either not recognizable or is not a contact of the user 402b in the one or more social networking services. Consequently, the attendee 412 is not added to the event social circle 400a.

The client device 406b may acquire a second image that includes the user 402a and the attendees 414, 416. It can be determined that the user 402a and the attendee 416 are each contacts of the user 402b within the one or more social networking services and that the user 402a and the attendee 416 can be added to event social circles of the user 402b. Consequently, the user 402a and the attendee 416 are included in the event social circle 400b. It can also be determined that the attendee 414 is either not recognizable or is not a contact of the user 402b in the one or more social networking services. Consequently, the attendee 414 is not added to the event social circle 400a.

In some implementations, event social circles of connected users can be compared to modify one or more of the event social circles. For example, and with continued reference to FIGS. 4A and 4B, it is determined that the users 402a, 402b are contacts of each other within the one or more social networking services (e.g., the user 402a is in the event social circle 400b, and the user 402b is in the event social circle 400a). Consequently, it can be determined that the event social circles 400a, 400b can be compared. As discussed above, the attendee 416 was not depicted in an image acquired by the client device 406a of the user 402a. The attendee 416, however, was added as a contact to the event social circle 400b of the user 402b. The event social circles 400a, 400b can be compared and it can be recognized that the attendee 416 is not included in the event social circle 400a. It can also be determined that the attendee 416 is a contact of the user 402a within the one or more social networking services and that the attendee 416 can be added to event social circles of the user 402a. Consequently, the attendee 416 may be added as a contact to the event social circle 400a of the user 402a. In some examples, the attendee 416 may be automatically added as a contact to the event social circle 400a of the user 402a. In some examples, the user 402a can be notified, or it can otherwise be suggested to the user 402a, that the attendee 416 can be added to the event social circle 400a, and the attendee 416 may be added in response to receiving confirmation or approval from the user 402a.

Figure 5:
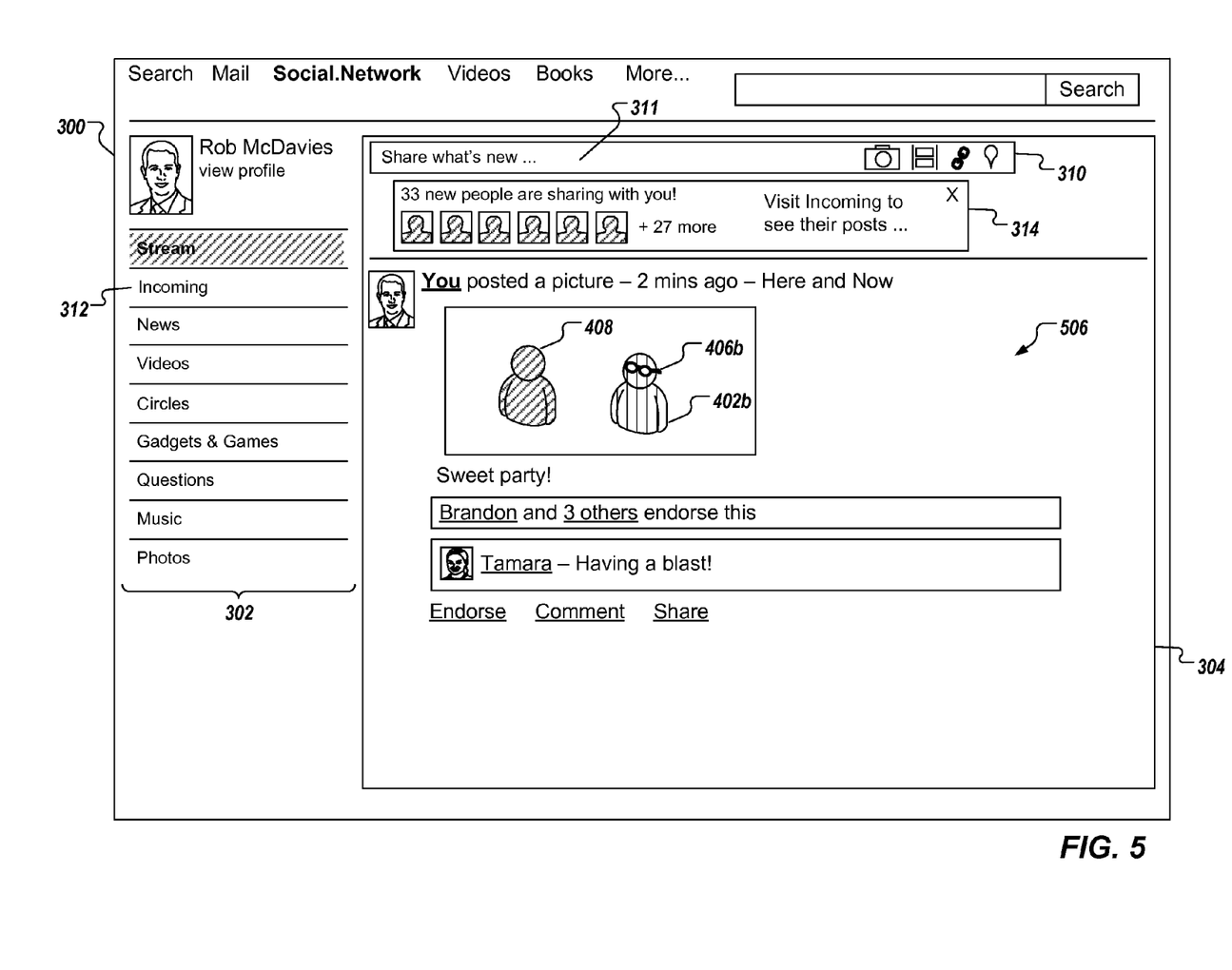
FIG. 5 depicts the example web page of FIG. 3 including an item of digital content distributed based on an event social circle.

FIG. 5 depicts the example web page 300 of FIG. 3 including an item of digital content 506 distributed based on the event social circle 400a of FIG. 4A. In the illustrated example, the example user "Rob McDavies" (e.g., the user 402a) distributes an item 506 that is acquired by the client device 406a during the event 400 to the contacts of the event social circle 400a. In this example, the item 506 is an image that depicts the attendee 408 and the user 402b. In some implementations, the item 506 may be automatically shared with contacts of the event social circle 400a, as discussed herein. In some implementations, the item 506 may be manually shared with contacts of the event social circle 400a in response to user input provided from that the user 400a, the user input prompting the social networking service to share the item 506. In some examples, the item 506 may be shared with the contacts of the event social circle 400a at a predetermined time period following generation of the image 506 by the client device 406a. In some implementations, the item 506 may be shared even though contacts can still be added and/or removed from the event social circle 400a. In the depicted example, and in response to sharing the item 506, a contact "Tamara" of the event social circle 400a (e.g., the attendee 408) may share content (e.g., a textual post) with the other contacts.

Figure 6:
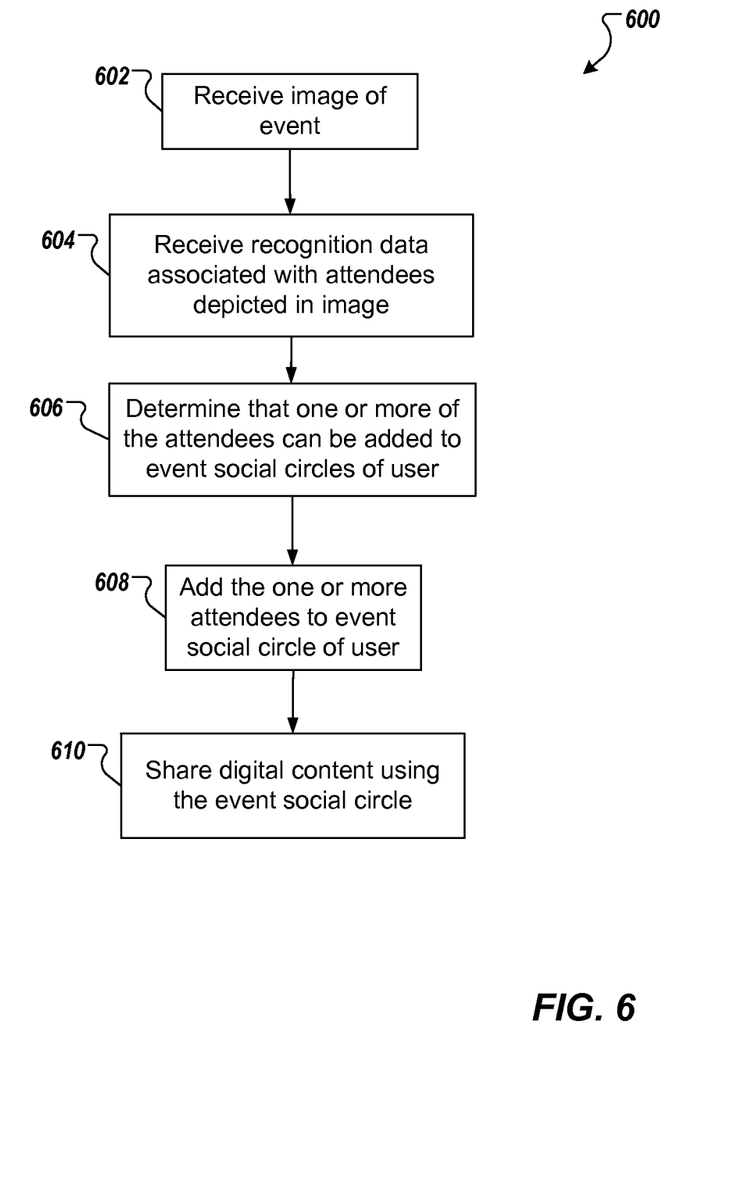
FIG. 6 is a flowchart of an example process that can be executed in implementations of the present disclosure.

FIG. 6 is a flowchart of an example process 600 that can be executed in implementations of the present disclosure. In some implementations, the example process 600 can include operations that are performed using one or more computer programs executed using one or more data processing apparatus (e.g., one or more client-side computing devices and/or one or more server-side computing devices). The example process 600 can be executed to automatically populate event social circles and to share items of digital content in one or more social networking services.

An image of an event is received (602). For example, a client device can generate an image of an event and can provide the image to a backend service. Recognition data associated with attendees depicted in the image is received (604). For example, the image can be processed for facial detection and recognition and recognition data associated with recognized attendees can be provided. In some examples, the recognition data can include identifiers respectively associated with each of the recognized attendees within the one or more social networking services. For example, an identifier can be associated with a user profile of an attendee within the one or more social networking services. It is determined that one or more of the attendees can be added to event social circles of the user (e.g., that provided the image) (606).

For example, it can be determined that each of the one or more attendees is a contact of the user within the one or more social networking services and that each of the one or more attendees can be added to event social circles associated with the user. Each of the one or more attendees is added to the event social circle (608). Digital content is shared using the event social circle (610). For example, the user can generate digital content during an event using the client device that generated the image. The digital content can be automatically shared to attendees of the event social circle, as discussed herein.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementation s are within the scope of the following claims. For example, the actions recited in the claims can be performed in a different order and still achieve desirable results.

What is claimed is:

1. A system comprising:
   one or more processors; and
   a non-transitory computer-readable medium coupled to the one or more processors and having instructions stored thereon which, when executed by the one or more processors, cause the one or more processors to perform operations comprising:
   receiving digital content streamed from a computing device of the user during an event, while the computing device is operating in an event-sharing mode, the digital content comprising a first image that displays context of the event;
   in response to receiving the digital content, automatically, processing the first image to detect a presence of a first attendee in the first image;
   receiving a first identifier associated with the first attendee, the first identifier being associated with a user profile of the first attendee in a computer-implemented social networking service;
   determining, based on the first identifier, that the first attendee is a contact of the user within the social networking service, and at least partially in response, automatically, while the computing device is operating in the event-sharing mode:
      populating an event social circle to include the first attendee, the event social circle being associated with the user and defining a distribution for digital content generated by the user through the social networking service;
      determining that the user is included in a second event social circle as an attendee, the second event social circle being associated with a second user, and determining that the second user is included in the event social circle, and in response:
         comparing attendees of the event social circle with attendees of the second event social circle; and
         determining that a third attendee in the second event social circle is not included in the event social circle, and at least partially in response, adding the third attendee to the event social circle; and
      distributing, during the event, the first image to the first attendee and the third attendee based on the event social circle.

2. The system of claim 1, wherein the computing device comprises a wearable computing device.

3. The system of claim 1, wherein the first image is provided as a frame of a video.

4. The system of claim 1, wherein the first image is processed to detect and recognize the first attendee within the first image.

5. The system of claim 1, wherein populating an event social circle to include the first attendee is executed in response to determining that the first attendee is a contact of the user within the social networking service and that the first attendee can be added to event social circles of the user.

6. The system of claim 5, wherein determining that the first attendee can be added to event social circles of the user includes determining that the user and the first attendee mutually agree to be included in event social circles of each other.

7. The system of claim 5, wherein determining that the first attendee can be added to event social circles of the user includes determining that the first attendee has agreed to be included in event social circles of other users of the social networking service.

8. The system of claim 1, wherein operations further comprise providing a notification to the first attendee that the first attendee has been added to the event social circle.

9. The system of claim 1, wherein the operations further comprise suggesting one or more social circles that can be used to share the digital content.

10. The system of claim 9, wherein each of the one or more social circles includes the first attendee.

11. The system of claim 1, wherein operations further comprise populating the event social circle to include a fourth attendee, the fourth attendee being a contact of each of the user and the first attendee within the social networking service and being absent from images generated during the event.

12. The system of claim 1, wherein operations further comprise:
   in response to receiving the digital content during the event, automatically, processing a second image of the digital content to detect a presence of a fourth attendee in the second image;
   receiving a fourth identifier associated with the fourth attendee, the fourth identifier being associated with a user profile of the fourth attendee in the social networking service; and
   determining, based on the fourth identifier, that the fourth attendee is not a contact of the user within the social networking service, and in response, excluding the fourth attendee from the event social circle.

13. The system of claim 1, wherein operations further comprise:
   determining that a fourth attendee depicted in a second image is a contact of the user within the social networking service, the second image being received during the event at a second time that is after a first time, at which the first image is received, and at least partially in response, automatically:
      adding the fourth attendee to the event social circle, and
      distributing the first image and the second image to the fourth attendee based on the event social circle.

14. The system of claim 1, wherein adding the third attendee to the event social circle is executed in response to determining that the third attendee is a contact of the user within the social networking service and that the third attendee can be added to event social circles of the user.

15. Non-transitory computer storage media encoded with one or more computer programs, the one or more computer programs comprising instructions that when executed by data processing apparatus cause the data processing apparatus to perform operations comprising:
- receiving digital content streamed from a computing device of the user during an event, while the computing device is operating in an event-sharing mode, the digital content comprising a first image that displays context of the event;
- in response to receiving the digital content, automatically, processing the first image to detect a presence of a first attendee in the first image;
- receiving a first identifier associated with the first attendee, the first identifier being associated with a user profile of the first attendee in a computer-implemented social networking service;
- determining, based on the first identifier, that the first attendee is a contact of the user within the social networking service, and at least partially in response, automatically, while the computing device is operating in the event-sharing mode:
  - populating an event social circle to include the first attendee, the event social circle being associated with the user and defining a distribution for digital content generated by the user through the social networking service;
  - determining that the user is included in a second event social circle as an attendee, the second event social circle being associated with a second user, and determining that the second user is included in the event social circle, and in response:
    - comparing attendees of the event social circle with attendees of the second event social circle; and
    - determining that a third attendee in the second event social circle is not included in the event social circle, and at least partially in response, adding the third attendee to the event social circle; and
  - distributing, during the event, the first image to the first attendee and the third attendee based on the event social circle.

16. The computer storage media of claim 15, wherein the computing device comprises a wearable computing device.

17. The computer storage media of claim 15, wherein the first image is provided as a frame of a video.

18. The computer storage media of claim 15, wherein the first image is processed to detect and recognize the first attendee within the first image.

19. The computer storage media of claim 15, wherein populating an event social circle to include the first attendee is executed in response to determining that the first attendee is a contact of the user within the social networking service and that the first attendee can be added to event social circles of the user.

20. The computer storage media of claim 19, wherein determining that the first attendee can be added to event social circles of the user includes determining that the user and the first attendee mutually agree to be included in event social circles of each other.

21. The computer storage media of claim 19, wherein determining that the first attendee can be added to event social circles of the user includes determining that the first attendee has agreed to be included in event social circles of other users of the social networking service.

22. The computer storage media of claim 15, wherein the operations further comprise suggesting one or more social circles that can be used to share the digital content.

23. The computer storage media of claim 22, wherein each of the one or more social circles includes the first attendee.

24. The computer storage media of claim 15, wherein adding the third attendee to the event social circle is executed in response to determining that the third attendee is a contact of the user within the social networking service and that the third attendee can be added to event social circles of the user.

25. A computer-implemented method executed by one or more processors, the method comprising:
- receiving, by the one or more processors, digital content streamed from a computing device of the user during an event, while the computing device is operating in an event-sharing mode, the digital content comprising a first image that displays context of the event;
- in response to receiving the digital content, automatically, processing the first image to detect a presence of a first attendee in the first image;
- receiving a first identifier associated with the first attendee, the first identifier being associated with a user profile of the first attendee in a computer-implemented social networking service;
- determining, by the one or more processors and based on the first identifier, that the first attendee is a contact of the user within the social networking service, and at least partially in response, automatically, while the computing device is operating in the event-sharing mode:
  - populating an event social circle to include the first attendee, the event social circle being associated with the user and defining a distribution for digital content generated by the user through the social networking service;
  - determining that the user is included in a second event social circle as an attendee, the second event social circle being associated with a second user, and determining that the second user is included in the event social circle, and in response:
    - comparing attendees of the event social circle with attendees of the second event social circle; and
    - determining that a third attendee in the second event social circle is not included in the event social circle, and at least partially in response, adding the third attendee to the event social circle; and
  - distributing, during the event, the first image to the first attendee and the third attendee based on the event social circle.

26. The method of claim 25, wherein the computing device comprises a wearable computing device.

27. The method of claim 25, wherein the first image is provided as a frame of a video.

28. The method of claim 25, wherein the first image is processed to detect and recognize the first attendee within the first image.

29. The method of claim 25, wherein populating an event social circle to include the first attendee is executed in response to determining that the first attendee is a contact of the user within the social networking service and that the first attendee can be added to event social circles of the user.

30. The method of claim 29, wherein determining that the first attendee can be added to event social circles of the user includes determining that the user and the first attendee mutually agree to be included in event social circles of each other.

31. The method of claim 29, wherein determining that the first attendee can be added to event social circles of the user includes determining that the first attendee has agreed to be included in event social circles of other users of the social networking service.

32. The method of claim 25, wherein the operations further comprise suggesting one or more social circles that can be used to share the digital content.

33. The method of claim 32, wherein each of the one or more social circles includes the first attendee.

34. The method of claim 25, wherein adding the third attendee to the event social circle is executed in response to determining that the third attendee is a contact of the user within the social networking service and that the third attendee can be added to event social circles of the user.

* * * * *